Aug. 21, 1934.    C. C. JACOBSON ET AL    1,971,187
HYDRAULIC REVERSING VALVE
Filed Oct. 8, 1931      3 Sheets-Sheet 1

Inventors:
Conrad C. Jacobson and
James Schweder,
By their Attorneys
Fraser, Myers & Manley

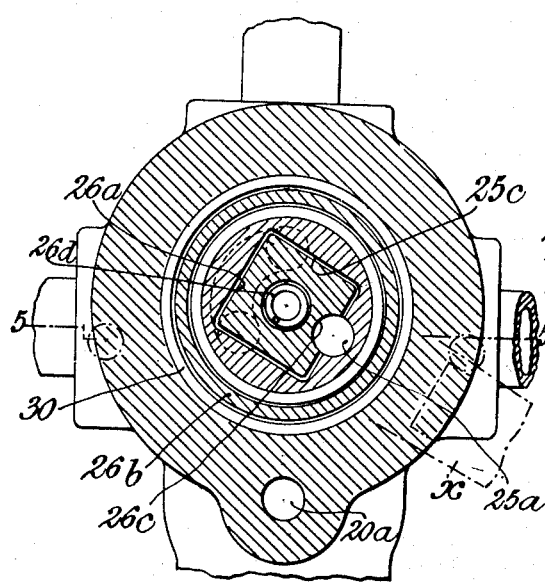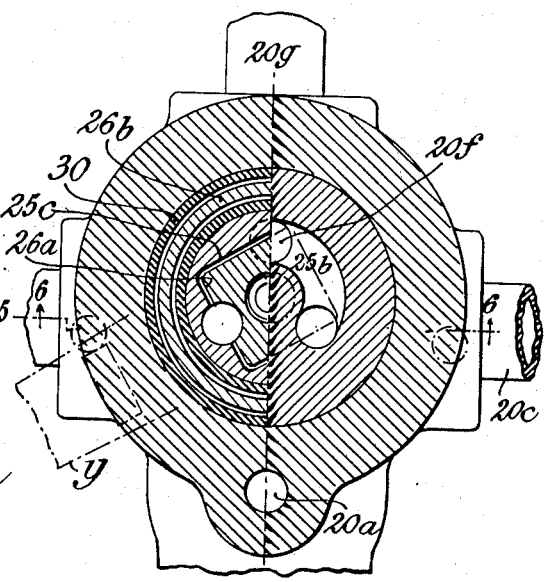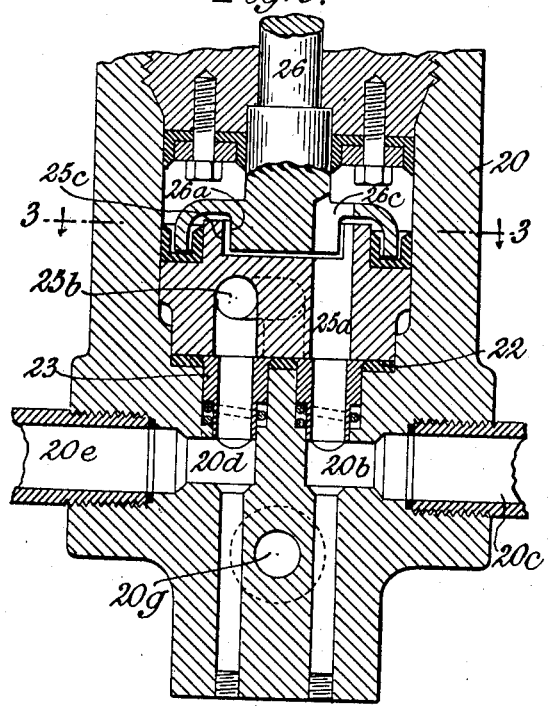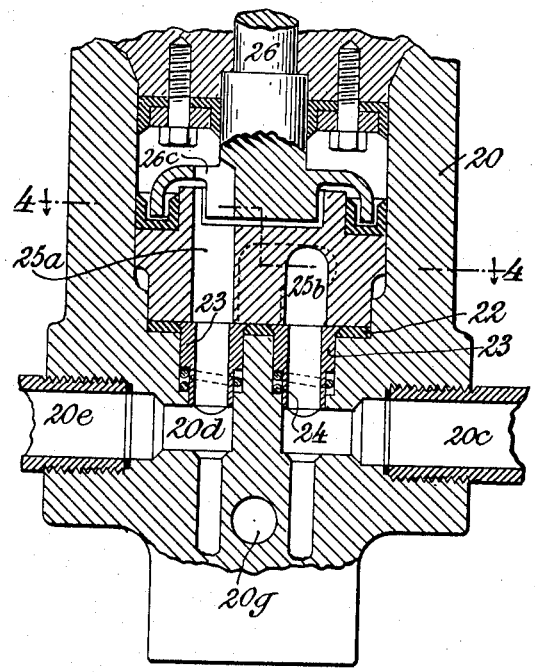

Aug. 21, 1934.   C. C. JACOBSON ET AL   1,971,187
HYDRAULIC REVERSING VALVE
Filed Oct. 8, 1931   3 Sheets-Sheet 3
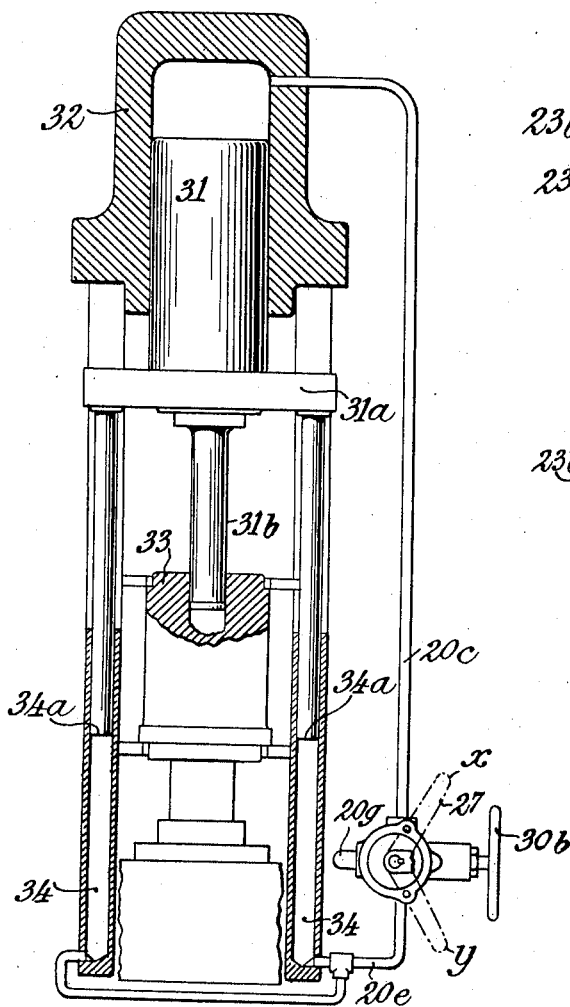
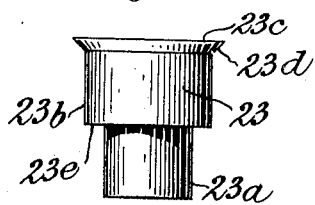
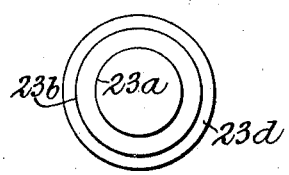
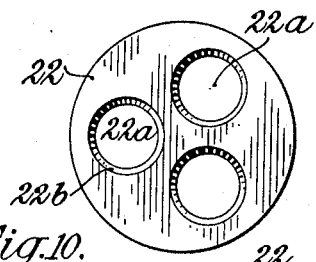
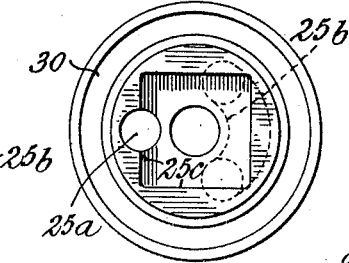
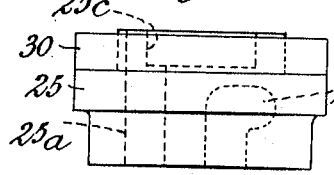

Patented Aug. 21, 1934

1,971,187

UNITED STATES PATENT OFFICE 1,971,187

HYDRAULIC REVERSING VALVE

Conrad C. Jacobson, Glen Ridge, N. J., and James Schweder, Brooklyn, N. Y., assignors to John Robertson Co., Inc., Brooklyn, N. Y., a corporation of New York Application October 8, 1931, Serial No. 567,618

6 Claims. (Cl. 251—87)

The present invention relates to hydraulic valves, and more particularly to an hydraulic reversing valve, and aims to provide certain improvements therein.

In the operation of hydraulic rams and the like, for example, in extrusion presses for covering cable wherein pressures upward of 6,000 lbs. per square inch are employed, the problem of satisfactorily manipulating and controlling the hydraulic reversing valve has been a vexatious one, and the present invention has for its object the solution of said problem.

According to the present invention we provide an hydraulic valve embodying new constructional features whereby proper valve seating and operation are assured under extremely high pressures and wherein through the intermediary of a secondary or slack-off valve the pressure is relieved from the control valve when the same is to be manipulated. The invention also includes other features of novelty which will be apparent from the detailed description which follows, when considered in conjunction with the accompanying drawings, wherein Figure 1 is a longitudinal section of an hydraulic reversing valve embodying our invention taken substantially along the plane of the line 1—1 of Fig. 2, portions of the operating handles of said valve being shown in elevation.

Fig. 2 is a transverse section taken substantially along the plane of the line 2—2 of Fig. 1.

Figs. 3 and 4 are transverse sections taken substantially along the planes of the lines 3—3 and 4—4 of Figs. 5 and 6, respectively, and show the arrangements of the valve passages in different operative positions of the valve.

Figs. 5 and 6 are longitudinal sections taken substantially along the planes of the lines 5—5 and 6—6, respectively, of Figs. 3 and 4.

Figs. 7 and 8 show the elevation and top plan, respectively, of the valve member per se.

Figs. 9 and 10 show a top plan and diametrical section, respectively, of the valve seat packing member.

Figs. 11 and 12 show an elevation and top plan view, respectively, of a detail of the invention.

Fig. 13 is a view, partly in section and partly in elevation, showing a schematic arrangement of the hydraulic reversing valve and its fluid connections with an extrusion press.

Figure 1:
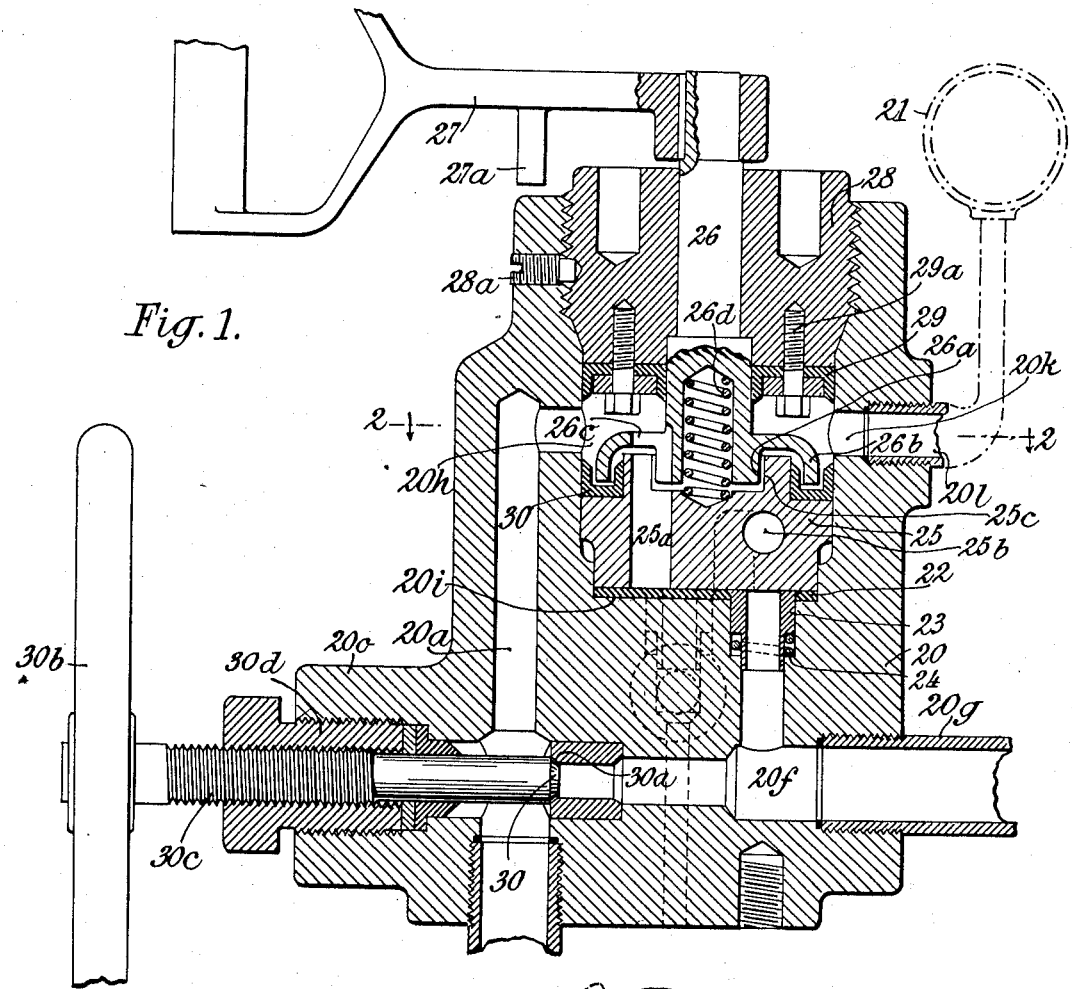

Referring to the drawings, let numeral 20 indicate the valve body member, which may be suitably formed from a casting of manganese bronze or other desirable metal, said casting having the desired configuration to permit of its being drilled and bored to provide the necessary passages or ducts therein, for example, the passage 20a for connection with a source of fluid pressure, with a passage 20b to which is connected a conduit 20c leading to the pressure side of a hydraulic piston, with a passage 20d connecting with a conduit 20e leading to the backing side of said piston, and with a conduit 20f connecting with a conduit 20g leading to a waste drain. The passages 20a, 20b, 20d and 20f all communicate with a valve chamber 20h of substantially cylindrical form having a flat valve seating face 20i of somewhat smaller cross-sectional area than the upper part of the valve chamber 20h. Also communicating with the valve chamber 20h is a passage 20k having a conduit 20l connected therewith, to which latter conduit is connected a pressure gauge 21.

The valve seat 20i is provided with a flat, compressible member preferably in the nature of a disk of leather 22 which has been suitably treated, said packing disk having three openings therein 22a, the centers of which are arranged in a common circle at points 120° apart. The packing 22 snugly fits within the base of the valve chamber, and its openings 22a are disposed in alignment with the passages 20b, 20d and 20f, the said openings on the seating face of the packing being countersunk, as indicated at 22b, for a purpose which will presently appear.

The passages 20b, 20d, and 20f, at their ends where they communicate with the valve chamber 20h, are each counter bored to accommodate a bushing 23, which has a uniform internal diameter and an external diameter of varying sizes, the smallest of which, 23a, is of a diameter to slidably engage the wall of the bore within which the bushing is fitted. A portion of said bushing of larger diameter, 23b, slidably engages the enlarged portion of the bores 20b, 20d and 20f. The outer end of said bushing is flat, as indicated at 23c, and at its external periphery is tapered rearwardly, as indicated at 23d, toward the portion 23b. Between the portions 23a and 23b of the bushing there is provided a shoulder 23e, between which and the shoulder formed by the enlargement in the bores 20b, 20d and 20f, is disposed a helical coil spring 24 which normally acts to project the flat end 23c of the bushing beyond the valve seating surface into the valve chamber 20h.

Disposed within the valve chamber 20h and seating upon the packing 22 is a valve member 25, the lower end of which snugly fits within the portion of the valve chamber of reduced diameter and the upper portion of which snugly fits within the enlarged valve chamber proper and is rotatable therein. This difference in diameters of the valve member 25 provides a greater surface upon which the hydraulic pressure may act in order to have a greater unit pressure per square inch on the valve seat than the hydraulic working pressure in the valve chamber and thus absolutely maintain a tight joint between the valve member 25 and the leather seat 23, leaving no possible chance of the valve member lifting off said seat. The valve member 25 has a passage 25a extending therethrough and adapted to establish selective communication between the valve chamber 20h above the valve member, and either of the passages 20b or 20d. The valve member 25 also has a cored or blind passage 25b, the terminals of which are 120° apart and open to the valve seating surface of the valve, and are adapted upon rotation of the valve member to selectively connect either the passage 20b or the passage 20d with the passage 20f. By forming the valve member exposed to the fluid pressure in the chamber with an area which is larger than the area of its seating face, the effective pressure acting on the seating face and serving to seat the valve is thereby increased. The tendency of fluid under pressure while passing through the valve member finding its way or gaining access under the seating face thereof and building up a back or balancing pressure which will unseat the valve is thereby overcome. For rotating the valve member 25 its top surface is formed with a squared socket 25c, within which is seated the squared inner end 26a of a valve stem 26, the outer end of which has keyed thereto an operating handle 27. The valve stem 26 extends through a valve head 28 which is screw-threadedly mounted within the valve body 20 and is held in fixed position therein by a set screw 28a. To insure against leakage of the pressure fluid from the valve chamber, the valve head is packed with a U packing 29 which is secured to the valve head by bolts 29a, and the valve member is packed with a U packing 30 which is held against withdrawal from its annular recess by a flange ring 26b formed integrally with the valve stem 26. The flange ring 26b is provided with an opening 26c in alignment with the passage 25a in the valve head so as to establish free communication between said passage and the valve chamber above said flange. For normally holding the valve member upon its seat there is provided a helical coil spring 26d disposed within a socket formed in the inner end of the valve stem, said spring normally acting upon the top of the valve member. The spring 26d, together with the weight of the valve member 25, normally presses the spring-pressed bushings 23 inwardly so that their outer ends 23c lie flush with the seating face of the packing 22. The cooperative relationship of the valve seating face 22, the spring-pressed bushings 23 and the valve member 25, are such that in rotating the valve upon its seat the danger of the edges of the packing around the openings curling or wearing is averted.

Figure 2:
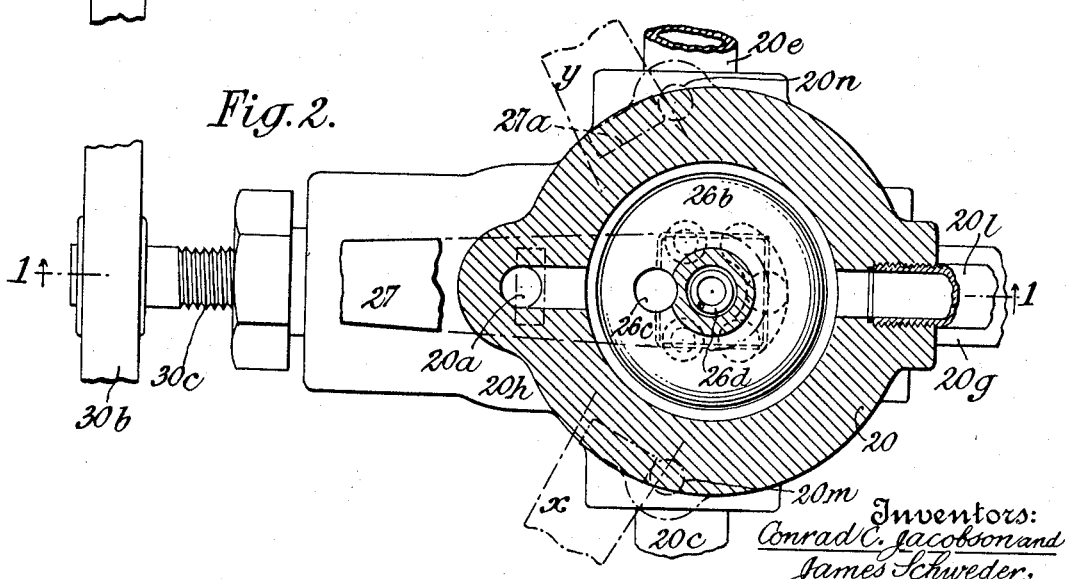

In Fig. 2 the operating handle 27 is shown in neutral position, that is to say, in a position such that no fluid can pass through the valve chamber. In Figs. 3 and 5 or in position x of the handle 27, fluid communication is established between the pressure source and the pressure side of an hydraulic piston through the valve chamber, and communication is also established between the backing side of said piston through the blind passage 25b of the valve member with the waste drain 20g. And similarly in Figs. 4 and 5, that is to say, the position y of the handle 27, fluid communication is established between the pressure source with the backing side of the piston through the valve and also between the pressure side of the piston through the blind passage in the valve with the waste drain. For governing the limiting positions x and y of the handle 27 so as to insure registry of the passages through the valve members, the operating handle 27 is provided with a lug 27a adapted for engagement with suitable lugs 20n and 20m on the top of the valve body member.

To render simple and efficient the reversing of the flow of fluid through the valve, especially so in view of the high pressures acting upon said fluid and which would normally render it impossible to rotate the valve on its seat while the pressure of the fluid passing through said valve was acting thereupon, we have introduced into the valve structure what we term a "slack-off" valve. This valve is introduced into the pressure supply line at a place such as to permit the establishment of fluid communication between said pressure line and waste drain. In Fig. 1 of the drawings this valve, indicated by the reference character 30, is introduced at the juncture of the passages 20a and 20f, and when seated upon its valve seat 30a normally cuts off communication between said passages. The operation of said valve is controlled by a hand wheel 30b which has a screw-threaded stem 30c in threaded engagement with a valve head 30d fitted within an offset boss 20o on the valve casing 20. Suitable packings, of course, are provided for preventing leakage.

In the use of the hydraulic reversing valve the slack-off valve 30 will be normally held seated while the operating handle 27 is in either the position x or y, the flow of the fluid through the valve in said positions having been previously explained. Now if it is desired to reverse the flow of fluid through the valve, the slack-off valve 30 is unseated, whereupon the pressure fluid is by-passed directly through the passage 20f, and the enormous pressure directly acting upon the valve 25 holding it upon its seat is thus relieved. The operating handle 27 is then swung around to the desired position x or y, which can be accomplished with but slight effort, after which the valve 30 is again closed, thus re-establishing the flow of pressure fluid through the valve 25.

In the schematic arrangement of the valve and the extrusion press with which it is operable, shown in Fig. 13, the conduit 20c is shown as connecting with the pressure side of a piston 31 movable within a cylinder 32, the piston at its forward end carrying a platen 31a and a ram 31b, the ram being movable within an extrusion cylinder 33. When the ram has reached the limit of its downward stroke and it is desired to return the ram upwardly, the operating handle 27 is moved from its position x to the position y after first manipulating the slack-off valve 30, whereupon the flow of fluid will be reversed and will pass through the conduit 20e into the backing cylinders 34, whereupon the pistons 34a connected with the platen 31a will be moved upwardly, carrying with it the piston 31, in the course of which movement the pressure fluid previously admitted into the cylinder 32 will be forced outwardly therefrom and will pass through the conduit 20c, through the blind passage 25b in the valve member 25, and out through the waste drain 20g.

From the foregoing detailed description it will be apparent that we have provided a novel form of valve particularly applicable as a reversing valve where extremely high pressures of fluid are employed, and one which, notwithstanding its comparatively simple construction, has been found to be entirely satisfactory in use with extrusion presses, the rams of which are subjected to pressures upward of 6,000 pounds per square inch. It is also to be understood that, although we have shown and described but a single embodiment of our invention, we do not desire to be limited to the details of construction disclosed, since it will be apparent to one skilled in the art that the same may be modified without departing from the spirit of the invention.

What we claim is:

1. An hydraulic valve capable of withstanding high pressures such as 6000 lbs. per square inch comprising a body member having passages therein, a flat, compressible valve seat therein having openings in alignment with the passages, a valve member movable upon said valve seat having passages adapted to be brought into registry with the openings in the seat, and nondeformable means mounted in the openings in said seat at the valve-engaging surface thereof and movable axially therein for safeguarding the contour of the compressible seat at said openings, said means being held flush with said seat by said valve.

2. An hydraulic valve comprising a body member having passages therein, a flat, compressible packing therein having openings in alignment with the passages, spring-pressed bushings in said passages extending into said openings in the packing and a valve member movable upon said packing having passages adapted to be brought into selective registry with the openings in the packing, said valve member normally holding the ends of the bushings flush with the valve engaging surface of the packing for safeguarding the contour of the compressible packing at said openings.

3. An hydraulic valve comprising a body member having passages therein, a compressible packing valve seat having openings in axial alignment with the passages, the openings on the seating face of the packing being countersunk, spring-pressed bushings in said passages extending through said openings, the outer ends of said bushings being externally rearwardly tapered to seat in the countersunk openings in the packing, and a valve member movable upon said packing valve seat and normally holding said bushing ends flush with the seating face of the packing.

4. An hydraulic valve capable of withstanding high pressures comprising a body member having a valve chamber provided with a flat, compressible valve seat, a valve member within said valve chamber held upon the seat therein and rotatable thereon, the area of the valve member exposed to the fluid pressure being greater than the area of the valve seating face of said member, said body member having passages extending into the chamber above said valve member and through the valve seat, the valve member having passages adapted to be brought into selective registry with the passages in the body member and means for rotating the valve member to bring the passages into desired registry.

5. An hydraulic reversing valve capable of withstanding high pressures comprising a body member having a valve chamber provided with a flat, compressible valve seat, a rotor valve member within said valve chamber and held upon the seat therein and rotatable thereon, the area of the rotor valve member exposed to the fluid pressure being greater than the area of the valve seating face of said member, said body member having passages extending into the chamber above said valve member and through the valve seat, a passage adapted to by-pass the pressure supply to the waste drain, a slack-off valve normally closing said passage, the rotor valve member having passages adapted to be brought into selective registry with the passages in the body member, and means for rotating the rotor valve member to bring the passages into desired registry.

6. An hydraulic valve capable of withstanding high pressures, comprising a body member having a valve chamber formed with a flat valve seat, a valve member within said valve chamber held upon the seat therein and rotatable thereon, said body member having a passage extending into the chamber above said valve member and passages extending through the valve seat, the valve member having a passage therethrough adapted for selective registry with the passages in the valve seat, and means for rotating the valve member to bring the passages into desired registry, the area of the valve member exposed to the fluid pressure in the chamber being greater than the area of the valve seating face of said member whereby to increase the unit pressure acting upon said seat in order to prevent pressure fluid when acting upon the valve from gaining access between the valve seat and the valve member.

CONRAD C. JACOBSON.
JAMES SCHWEDER.